July 4, 1961  TAMOTSU IMADA ET AL  2,991,402
SINGLE PHASE ELECTRIC MOTOR OF FERRO RESONANCE TYPE
Filed March 11, 1958
3 Sheets-Sheet 3

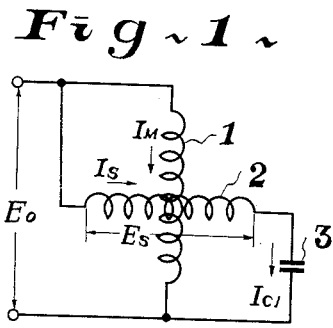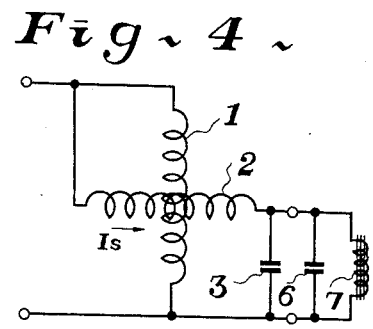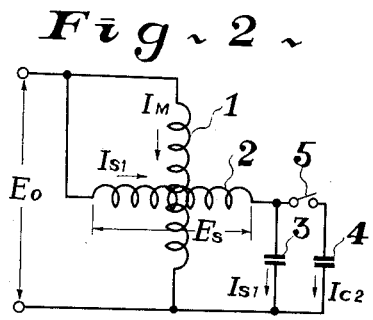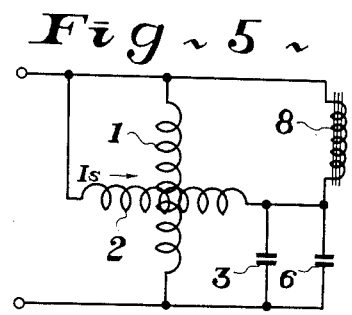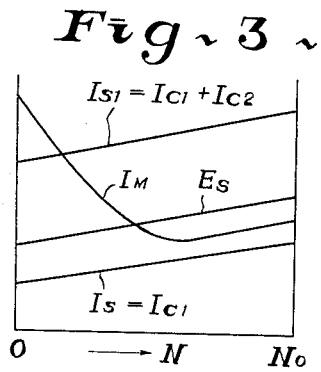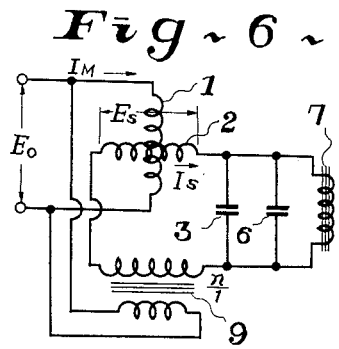

INVENTORS
TAMOTSU IMADA and
SEIJI OTOBE

BY
ATTORNEYS

United States Patent Office 2,991,402
Patented July 4, 1961

2,991,402
SINGLE PHASE ELECTRIC MOTOR OF FERRO RESONANCE TYPE
Tamotsu Imada, Tokyo, and Seiji Otobe, Yono-machi, Kitaadachi-gun, Japan, assignors to San-Ei Kogyo Limited, Tokyo, Japan
Filed Mar. 11, 1958, Ser. No. 720,641
Claims priority, application Japan Mar. 22, 1957
6 Claims. (Cl. 318—221)

This invention relates in general to single phase electric motors, and more particularly to single phase electric motors in which control of the starting and running current is achieved automatically.

A single phase induction motor particularly of a small size is widely used for its simplicity in construction and because of ready availability of conventional electric source. However, various countermeasures must be considered to augment its extremely weak starting torque which is a deficiency inherent with this type of motor.

An object of this invention is to provide a single phase electric motor having a high starting torque.

Another object of this invention is to provide a single phase electric motor in which the control of the starting and running current is achieved automatically.

Another object of this invention is to provide a single phase electric motor of the ferro resonance type, which eliminates disadvantages as described above.

These and other objects of this invention have been achieved by use of an auxiliary circuit composed of a parallel or a series circuit of a condenser and a coil with a saturated iron core.

The novel feature of this invention is set forth with particularity in the appended claims. This invention itself, however, both as to its construction and manner of operation, together with comparison with the conventional single phase induction motor and additional objects and advantages thereof, will be fully understood from the following description in connection with the accompanying drawings, in which:

FIG. 1 is a connection diagram showing a fundamental electric motor of condenser type.

FIG. 2 is a connection diagram showing a conventional electric motor of condenser start type.

FIG. 3 is a graph showing characteristic curves of an electric motor shown in FIG. 1.

FIG. 4 is a connection diagram showing an example of this invention, in which an auxiliary winding composed of a parallel circuit of a condenser and a coil with a saturated iron core is used.

FIG. 5 is a connection diagram showing another example of this invention, in which an auxiliary winding composed of a series circuit of a condenser and a coil with a saturated iron core is used.

FIG. 6 is a modified connection diagram of that shown in FIG. 4, in which an elevated electric voltage is applied to an auxiliary winding.

Figure 7:
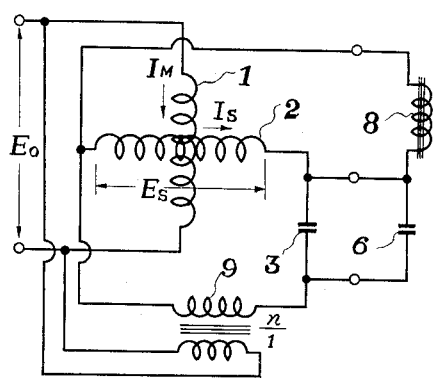
FIG. 7 is also a modified connection diagram of that shown in FIG. 5 in which an elevated electric voltage is applied to an auxiliary winding.

One of the most widely used single phase electric motor of condenser type is shown in FIG. 2, in which a starting condenser 4 is connected in parallel with the original condenser 3 by means of a centrifugal switch 5, the said condenser 3 being connected in series with the auxiliary winding 2 which is situated electrically 90 degrees out of phase with the main winding 1. In the motor shown in FIG. 2, with the closure of the switch 5 in the state of starting, a large electric current flows through the auxiliary winding 2 because of the connection of the condenser 4 and thereby developing a large starting torque, the said torque being proportional to the product of the electric current $I_M$ in the main winding 1 and electric current $I_{s1}$ in the auxiliary winding 2. However, as the electric motor begins to rotate, a voltage $E_s$ which is proportional to the revolution of the electric motor will be induced in the auxiliary winding 2 and as the current $I_{s1}$ is proportional to the sum of input voltage $E_0$ of the motor and aforenoted voltage $E_s$, the winding is liable to be burned out, because a big electric current will flow through the auxiliary winding 2 if said condenser 4 of large capacity is left connected even after the motor starts. The centrifugal switch 5 serves to cut off the condenser 4 after the motor starts thereby leaving only the original condenser 3 of small capacity connected and reducing the said large electric current. Therefore, this starting mechanism is not economical because of the necessity of a condenser of large capacity as well as a centrifugal switch device which are not utilized after the motor has started. Moreover, these devices are troublesome from the standpoint of maintenance because of the entailment of a mechanically operating part such as a centrifugal switch device. In FIG. 3 is shown characteristic curves showing the relations of motor speed, electric currents $I_{s1}$, $I_s$, $I_M$ and electric voltage $E_s$ in the electric motor of the type shown in FIG. 1.

The electric motor of this invention is characterized by utilization of parallel or series ferro resonance phenomenon as shown in FIG. 4 and FIG. 5, in which an original condenser 3 is connected in series with the auxiliary winding 2 which is situated electrically 90 degrees out of phase with the main winding 1.

In FIG. 4, a parallel circuit composed of a condenser 6 having enough capacity and a coil 7 with a saturated iron core is connected in parallel with the said condenser 3. In FIG. 5, a series circuit composed of a condenser 6 having enough capacity and a coil 8 with a saturated iron core is connected to the main circuit so that the condenser 6 is parallel with the original condenser 3 and the coil 8 is parallel with the auxiliary winding 2.

While the electric motor is running, electromotive force is induced in the auxiliary coil 2 of the motor, which is proportional in magnitude to the running speed of the motor and so self-impedance of the auxiliary coil increases together with increase of running speed of the motor. According to the two characteristics above mentioned and by existence of the saturated coil with a saturated iron core which is connected in parallel or series with auxiliary winding, the following phenomena will take place.

(A) In the stage of starting of the motor, said self-impedance of the coil 7 or 8 having a saturated iron core is very high and the motor runs in the state as if there is no coil 7 or 8, so that a large starting current can be introduced to the auxiliary coil 2.

(B) In the running state of the motor, as said self-impedance of the coil 7 or 8 with the saturated iron core becomes low according to increase of the terminal voltage of the coil 7 or 8, the condenser current, which increased proportionally to the increase of running speed, is divided into two paths, one to the auxiliary winding 2 and the other to the coil 7 or 8. So the current control in the motor is performed electrically automatically as if the starting condenser is removed by a centrifugal switch device. Moreover, the current control above mentioned is performed continuously and not suddenly as in the case of condenser removal by a centrifugal switch device.

(C) When loads are applied, said self-impedance of the coil 7 or 8 having saturated iron core increases electrically automatically and continuously together with increase of loads, thus increased torque of the motor is induced.

The electric motor iof this invention has the characteristics above mentioned which are very much suitable to the actual conditions of running of electric motor.

Figure 8:
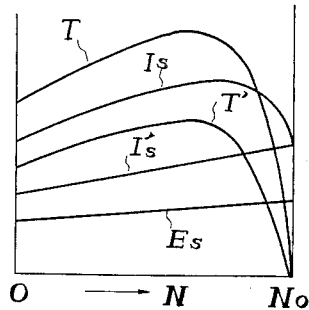
FIG. 8 is a graph showing characteristic curves of electric motors both ferro resonance type and of conventional type.

In FIG. 8 are shown characteristic curves of the electric motor of saturated ferro resonance type of this invention shown in FIG. 4, FIG. 5 and a conventional condenser motor, where, $T$, $I_s$ = torque and current flowing through the auxiliary winding 2 of the motor of this invention shown in FIG. 4, FIG. 5.
$T'$, $I_s'$ = torque and current flowing through auxiliary winding 2 of the conventional motor shown in FIG. 1.
$E_s$ = terminal voltage of auxiliary winding 2.
$N$ = running speed of electric motor.
$N_0$ = synchronous speed of the motor.

Figure 9:
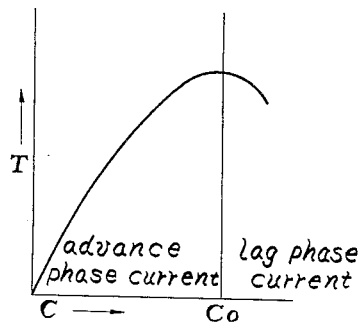
FIG. 9 is a graph showing one characteristic between the capacitance of a condenser and torque of an electric motor of condenser type.

In the case of said electric motor of saturated ferro resonance type of this invention, resonance phenomenon between self-impedance of the auxiliary winding and the capacitance of condenser C as well as in the case of conventional motor shown in FIG. 1 takes place when the value of capacity C becomes $C_0$. And, when the value of capacitance of condenser C advances beyond $C_0$, starting torque T decreases. So that there is a limit in increasing starting torque by increasing condenser capacity C. This can be seen by reference to FIG. 9 where variations in the capacitance C is plotted against variations in the torque of the motor.

The electric motors shown in FIG. 6 and FIG. 7 are modifications of this invention suppressing the above-mentioned defects. In said motors of the type shown in FIG. 6 and FIG. 7, the voltage of the electric source is elevated by a transformer 9 by $n$ times and applied to auxiliary winding 2. By the elevation of the electric voltage, not only larger starting torque can be utilized but also undesirable effect of electromotive force induced in the auxiliary coil in running state can be reduced and quiet running and large torques can be expected. These are improved electric motors of saturated ferro resonance type. Transformers composed of compound winding or single winding can be used in these types of the electric motor.

Figure 10:
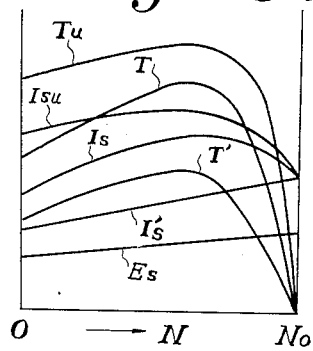
FIG. 10 is a graph showing characteristics of the electric motor shown in FIG. 6 and FIG. 7.

In FIG. 10 are shown characteristic curves of the electric motors of the type above mentioned in which increased starting torque and maximum torque compared with those shown in FIG. 8 can be seen. The letters used in FIG. 10 indicate as follows:

$T_u$ = torque of the motors of the type shown in FIG. 6 and FIG. 7.
$T$ = torque of the motors of the type shown in FIG. 4 and FIG. 5.

$T'$ = torque of the conventional condenser motor shown in FIG. 1.
$I_{su}$ = electric current flowing through auxiliary winding 2 of the motors of the type shown in FIG. 6 and FIG. 7.
$I_s$ = electric current flowing through auxiliary winding 2 of the motor of the type shown in FIG. 4 and FIG. 5.
$I_s'$ = electric current flowing through auxiliary winding 2 of conventional condenser motor shown in FIG. 1.
$E_s$ = electric voltage applied to the terminals of the auxiliary winding 2.
$N$ = running speed of the electric motor.
$N_0$ = synchronous speed of the motor.

In FIG. 2, FIG. 4, FIG. 5, FIG. 6 and FIG. 7 the condenser 3 for phase advance and the condenser 4 or 6 for torque increases are shown as separate capacitances. Of course, one condenser having a capacitance equivalent to the sum of the capacitances of condensers 3 and 4 or 6 can be used, replacing them.

Figure 11:
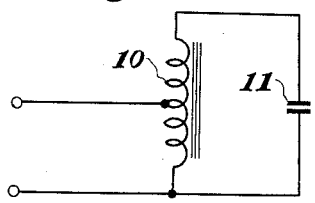
FIG. 11 is a diagram showing a circuit of a condenser and a transformer which applies an elevated electric voltage to said condenser.
Figure 12:
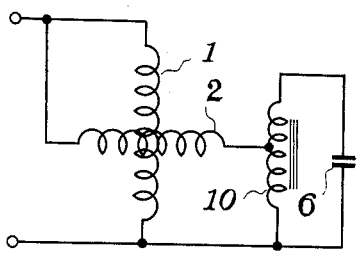
FIG. 12 is a connection diagram showing an example of application of the circuit shown in FIG. 11 to the circuit shown in FIG. 4.
Figure 14:
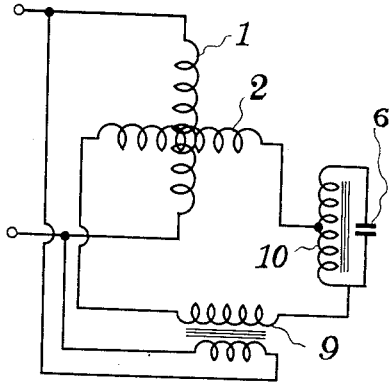
FIG. 14 is a modified connection diagram of the circuit shown in FIG. 12 by applying elevated voltages to the auxiliary circuit of parallel type.
Figure 13:
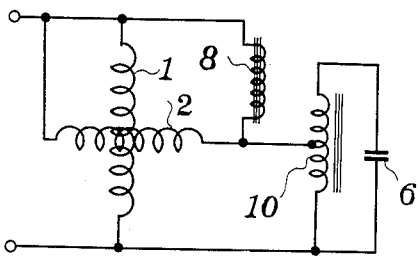
FIG. 13 is a connection diagram showing also an example of the circuit of FIG. 11 applied to the circuit shown in FIG. 5.
Figure 15:
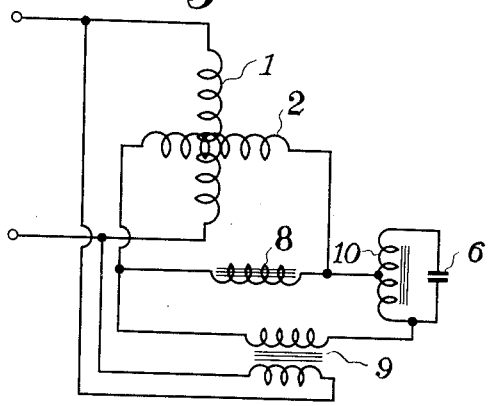
FIG. 15 is a modified connection diagram of the circuit shown in FIG. 13 by applying elevated voltages to the auxiliary circuit of series type.

A transformer 10 shown in FIG. 11 can be utilized for decreasing the effective capacitance of condenser 11 and yet maintaining equal advantages. That is, if the transformer 10 elevates electric voltage two times up by using a central tap, the capacitance of the condenser 11 can be reduced to ¼. Furthermore, better results are obtained when the transformer 10 is of the saturation type, as coils 7 and 8. In FIG. 12 and FIG. 13 are shown connection diagrams of electric motors of this type. FIG. 14 and FIG. 15 show connection diagrams of the electric motors of the type shown in FIG. 12, FIG. 13 employing step-up transformers 9 for supplying power to the auxiliary winding circuit. As shown in FIG. 14, step-up transformer 9 supplies power to autotransformer 10 and condenser 6. The auxiliary winding 2 of the motor is connected to a tap on the transformer 10. FIG. 15 is like FIG. 14 with the addition of a reactor 8 in parallel with winding 2.

As explained above, this invention is characterized in that a coil with a saturated iron core is connected in parallel with the condenser which is connected in series with the auxiliary winding, or connected in series with the condenser and in parallel with the auxiliary winding, and controls the effective capacitance of the condenser electrically, automatically and continuously in accordance with running state of the motor availing the change of self-impedance of said coil with saturated iron core.

Accordingly, the motor of this invention gives the following useful advantages:

(1) Current control is carried out electrically, automatically and continuously, and the troublesome operation of connecting a starting condenser to start the motor and disconnecting the same after the motor started becomes unnecessary.

(2) Consequently, a starting device such as a centrifugal switch device to cut off said starting condenser becomes unnecessary.

(3) Construction of the motor becomes not only simple but also durable and furthermore, maintenance of the motor becomes very easy and chance for breakdown is minimized because of the absence of mechanically moving device such as a centrifugal switch device.

(4) Torque-speed characteristics in loaded state are superior to those of any one of the conventional repulsion motors, split phase winding motors and condenser motors.

(5) Small but powerful motors can be acquired by applying elevated electric voltage to the auxiliary winding.

(6) The motor can be made more powerful by using said transformer type coil with saturated iron core in connection with a condenser.

While we have described particular embodiments of our invention, it will, of course, be understood that we do not intend it to be limited thereto, since many modifications may be made and we, therefore, contemplate by the appended claims to cover all such modifications as fall within the true spirit and scope of our invention.

Thus explaining our invention, we claim:

1. A single phase electric motor including a main winding, an auxiliary winding electrically out of phase with the main winding, means for connecting said main winding to a source of alternating current, a step-up transformer having a primary winding and a secondary winding, said primary winding being connected to said alternating current source, a condenser connected in series with said auxiliary winding for increasing the starting torque of said motor, said auxiliary winding and said condenser being connected to said secondary winding of said step-up ransformer, and a coil with a saturated iron core connected in the secondary circuit of said transformer to gradually reduce the reactive effect of said condenser.

2. A single phase electric motor as defined in claim 1 wherein said coil is connected in parallel with said condenser.

3. A single phase electric motor as defined in claim 1 wherein said coil is connected in parallel with said auxiliary winding.

4. A single phase electric motor including a main winding, an auxiliary winding electrically out of phase with the main winding, means for connecting said main winding to a source of alternating current, a step-up transformer having a primary winding and a secondary winding, said primary winding being connected to said alternating current source, an auto transformer connected in series with said auxiliary winding and the secondary winding of said step-up transformer, and a condenser connected to said auto transformer to receive an elevated voltage therefrom, whereby said condenser initially increases the starting torque of said motor, and said auto transformer gradually reduces the effect of said condenser as said motor approaches running speed.

5. A single phase electric motor as defined in claim 4 including a coil with a saturated iron core connected in parallel with said auxiliary winding.

6. A single phase electric motor as defined in claim 5 wherein the core of said auto transformer is magnetically saturated.

References Cited in the file of this patent

UNITED STATES PATENTS

| | | |
|---|---|---|
| 1,708,910 | Spencer | Apr. 9, 1929 |
| 1,908,522 | Lyden | May 9, 1933 |

FOREIGN PATENTS

| | | |
|---|---|---|
| 43,760 | France | June 11, 1934 |